(12) United States Patent
Goll et al.

(10) Patent No.: US 10,900,388 B2
(45) Date of Patent: Jan. 26, 2021

(54) ELECTROHYDRAULIC VALVE AND METHOD FOR PRODUCING THE ELECTROHYDRAULIC VALVE

(71) Applicant: ECO Holding 1 GmbH, Marktheidenfeld (DE)

(72) Inventors: Juergen Goll, Collenberg (DE); Sebastian Nickel, Gemünden am Main (DE); Andre Selke, Lohr am Main (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 122 days.

(21) Appl. No.: 16/106,370

(22) Filed: Aug. 21, 2018

(65) Prior Publication Data
US 2019/0055967 A1 Feb. 21, 2019

(30) Foreign Application Priority Data

Aug. 21, 2017 (DE) .......................... 10 2017 119 082
May  4, 2018 (DE) .......................... 10 2018 110 753

(51) Int. Cl.
*F16K 31/10* (2006.01)
*F01L 1/46* (2006.01)
(Continued)

(52) U.S. Cl.
CPC ............... *F01L 1/46* (2013.01); *B23K 20/10* (2013.01); *B23P 15/001* (2013.01); *F01L 1/344* (2013.01);
(Continued)

(58) Field of Classification Search
CPC . F01L 1/46; F01L 1/344; F01L 1/3442; F01L 2001/3443; F01L 2101/00;
(Continued)

(56) References Cited

U.S. PATENT DOCUMENTS 5,757,259 A * 5/1998 Fulford ................ F02M 57/025
                                                             335/278
5,820,099 A * 10/1998 Rahbar ................ F02M 51/005
                                                            251/129.15
(Continued)

FOREIGN PATENT DOCUMENTS

CN          102003273 A      4/2011
CN          201851751 U      6/2011
(Continued)

*Primary Examiner* — Minh Q Le
(74) *Attorney, Agent, or Firm* — Von Rohrscheidt Patents (57) ABSTRACT

An electrohydraulic valve including an electromagnetic actuator assembly; and a hydraulic assembly, wherein the electromagnetic actuator assembly and the hydraulic assembly are arranged in axial alignment along a longitudinal axis, wherein the hydraulic assembly includes a valve housing in which a valve piston is arranged axially movable along the longitudinal axis, wherein the electromagnetic actuator assembly includes an actuator housing, a coil configured to generate a magnetic field and an armature that is arranged axially movable along the longitudinal axis to position the valve piston, wherein a connection is formed between the electromagnetic actuator assembly and the hydraulic assembly, wherein the actuator housing is formed by an encasement of at least the coil with a synthetic material through injection molding, wherein a circumferential annular groove is formed in which a seal element is positioned that seals the electromagnetic actuator assembly between the hydraulic assembly and the electromagnetic actuator assembly.

13 Claims, 4 Drawing Sheets

(51) Int. Cl.
*F16K 27/04* (2006.01)
*F01L 1/344* (2006.01)
*B23K 20/10* (2006.01)
*B23P 15/00* (2006.01)
*F15B 13/043* (2006.01)
*F15B 13/00* (2006.01)

(52) U.S. Cl.
CPC ........ *F01L 1/3442* (2013.01); *F15B 13/0435* (2013.01); *F16K 27/048* (2013.01); *F01L 2001/3443* (2013.01); *F01L 2301/00* (2020.05); *F01L 2303/00* (2020.05); *F15B 13/00* (2013.01)

(58) Field of Classification Search
CPC .... F01L 2103/00; B23K 20/10; B23P 15/001; F15B 13/00; F15B 13/0435; F16K 27/048
USPC .................... 137/596.16, 487.5; 251/129.15
See application file for complete search history.

(56) References Cited

U.S. PATENT DOCUMENTS

| | | | | |
|---|---|---|---|---|
| 6,313,726 | B1* | 11/2001 | Golovatai-Schmidt | H01F 7/17 251/129.09 |
| 7,051,993 | B2* | 5/2006 | Kim | F02M 51/0685 251/129.15 |
| 7,383,851 | B2* | 6/2008 | Jacobsen | F16K 31/0665 137/14 |
| 8,006,719 | B2* | 8/2011 | Nordstrom | F16K 31/0613 137/625.68 |
| 9,567,878 | B2* | 2/2017 | Lang | F01L 1/34 |
| 10,054,241 | B2* | 8/2018 | Hilzendegen | F16K 11/0708 |
| 2002/0129796 | A1* | 9/2002 | Shimizu | F01L 1/34 123/500 |
| 2005/0189510 | A1* | 9/2005 | Golovatai-Schmidt | F16K 31/0637 251/129.15 |
| 2006/0185652 | A1* | 8/2006 | Tsuge | F16K 1/34 123/519 |
| 2007/0175425 | A1* | 8/2007 | Berndorfer | F01L 1/34 123/90.17 |
| 2009/0114865 | A1* | 5/2009 | Homann | F15B 13/0835 251/129.15 |
| 2012/0132165 | A1* | 5/2012 | Waters | F01L 1/344 123/90.17 |
| 2013/0061959 | A1* | 3/2013 | Stephens | F01L 1/344 137/544 |
| 2013/0068975 | A1* | 3/2013 | Kondo | F01L 1/34 251/129.01 |
| 2013/0196104 | A1* | 8/2013 | Matsumoto | C08L 79/08 428/36.92 |
| 2013/0221293 | A1* | 8/2013 | Shirakawa | C08L 69/00 252/601 |
| 2013/0333773 | A1* | 12/2013 | Holmes | F16K 31/0613 137/487.5 |
| 2015/0285106 | A1* | 10/2015 | Nguyen | F01L 1/344 123/90.17 |
| 2017/0167617 | A1* | 6/2017 | Layne | F16K 11/07 |
| 2018/0306346 | A1* | 10/2018 | Becker | F16K 39/022 |

FOREIGN PATENT DOCUMENTS

| | | |
|---|---|---|
| CN | 103016821 A | 4/2013 |
| CN | 204459382 | 7/2015 |
| CN | 105317495 A | 2/2016 |
| DE | 102007059855 A1 | 6/2009 |
| DE | 102009043320 A1 | 4/2011 |
| DE | 102014010876 B3 | 10/2015 |

\* cited by examiner

ELECTROHYDRAULIC VALVE AND METHOD FOR PRODUCING THE ELECTROHYDRAULIC VALVE

RELATED APPLICATIONS

This application claims priority from and incorporates by reference German patent applications DE 10 2017 119 082.1 filed on Aug. 21, 2017 and DE 10 2018 110 753.6 filed on May 4, 2018, both of which are incorporated in its entirety by this reference.

FIELD OF THE INVENTION

The invention relates to an electrohydraulic valve.

BACKGROUND OF THE INVENTION

Electrohydraulic valves of this type are known for example from DE 10 2014 010 876 B3 and DE 10 2009 043 320 A1.

When mounting the electromagnetic actuator assembly and the hydraulic assembly a connection is generated in an end position of the two subassemblies. It is known in the art to form this connection between a tube that envelops the coil at least partially and the hydraulic assembly in particular the valve housing or a bushing of the hydraulic assembly wherein the tube is produced by stamping and rolling a piece of sheet metal. It is a disadvantage of this configuration that the hydraulic fluid that is to be transported by the valve leaks through the tube, in particular due to the fabrication method. Thus, the hydraulic fluid leaks in particular from the environment of the valve. This has compromised a function of the actuator assembly, in particular of the coil.

BRIEF SUMMARY OF THE INVENTION

Thus, it is an object of the invention to provide an electrohydraulic valve with an electromagnetic actuator assembly and a hydraulic assembly, in particular an electrohydraulic valve of a cam phaser which reliably seals the electromagnetic actuator assembly relative to the hydraulic assembly and the ambient and which eliminates possible leakages. It is another object of the invention to provide a method for producing the electrohydraulic valve.

The object is achieved according to the invention by an electrohydraulic valve including an electromagnetic actuator assembly; and a hydraulic assembly, wherein the electromagnetic actuator assembly and the hydraulic assembly are arranged in axial alignment along a longitudinal axis, wherein the hydraulic assembly includes a valve housing in which a valve piston is arranged axially movable along the longitudinal axis, wherein the electromagnetic actuator assembly includes an actuator housing, a coil configured to generate a magnetic field and an armature that is arranged axially movable along the longitudinal axis to position the valve piston, wherein a connection is formed between the electromagnetic actuator assembly and the hydraulic assembly, wherein the actuator housing is formed by an encasement of at least the coil with a synthetic material through injection molding, wherein a circumferential annular groove is formed in which a seal element is positioned that seals the electromagnetic actuator assembly between the hydraulic assembly and the electromagnetic actuator assembly, and wherein the encasement with the synthetic material through the injection molding defines the circumferential annular groove in the radial direction and forms a circumferential sealing surface for the seal element.

The object is also achieved by A method for producing the electro hydraulic valve recited supra, the electro hydraulic valve including an electromagnetic actuator assembly, and a hydraulic assembly, wherein the hydraulic assembly includes at least a valve housing, and wherein the actuator assembly includes an actuator housing and at least a coil, the method comprising the steps forming the actuator housing of the actuator assembly by encasing at least the coil with a synthetic material through injection molding; encasing a connection element through the injection molding; forming a connection between the connection element and the hydraulic assembly in a form locking manner between the connection element and the valve housing or a bushing of the hydraulic assembly.

Advantageous embodiments of the invention are provided in the dependent claims.

An electrohydraulic valve is particularly advantageous which includes an electromagnetic actuator assembly and a hydraulic assembly wherein the actuator assembly and the hydraulic assembly are arranged axially aligned along a longitudinal axis, wherein the hydraulic assembly includes a valve housing in which a valve piston is arranged axially movable along a longitudinal axis wherein the actuator assembly includes an actuator housing, a coil generating a magnetic field and an armature that is axially movable along the longitudinal axis for positioning the valve piston and wherein a connection is formed between the actuator assembly and the hydraulic assembly, wherein the actuator housing is formed by encasing at least the coil with a synthetic material through injection molding and wherein a circumferential annular groove is provided that includes a seal element that seals the actuator assembly between the hydraulic assembly and the actuator assembly wherein the encasement with the synthetic material defines the circumferential annular groove in the radial direction and forms a circumferential sealing surface for the seal element.

The sealing according to the invention protects the actuator assembly against potential leakages. In particular a passage of the hydraulic fluid or of an ambient medium to the coil can be prevented. This is performed by providing the synthetic material encasement as a circumferential sealing surface which reliably seals leak spots of the actuator assembly so that no medium can pass through the joint of the actuator assembly.

The seal element can be arranged for example as an O-ring seal in the annular groove. The circumferential annular groove can be formed by an annular groove in the hydraulic assembly whereas the opposite piece is flat respectively. Alternatively the circumferential annular groove can be configured by aligned annular grooves in the actuator assembly as well as in the hydraulic assembly. The groove can be a triangular groove, thus it can have a triangular cross section. The actuator assembly and the hydraulic assembly are sized so that the seal element is pressed into the annular groove after the connection is established. The assemblies are pressed together with a suitable joining force, wherein the inserted O ring seal is compressed concurrently. After establishing the connection the seal element is axially compressed permanently.

The valve can be in particular an electro hydraulic valve of a cam phaser.

The electro hydraulic valve includes a valve piston that is axially movable in the valve housing of the hydraulic assembly of the electro hydraulic valve. Furthermore a first operating connection, a second operating connection and a supply connection can be configured at the valve housing. The first operating connection and the second operating connection are connected with the cam phaser and a hydraulic fluid is feedable through these connections into the electro hydraulic valve as well as from the electro hydraulic valve. In order to supply the electro hydraulic valve with hydraulic fluid that is fed by a feed arrangement the valve housing includes the supply connection. The hydraulic fluid can flow through the electro hydraulic valve on different paths controlled by a flowable channel system of the valve piston.

The valve piston is moved by the electromagnetic actuator assembly of the electro hydraulic valve. For this purpose the actuator assembly includes a typically axially movable armature which is directly or indirectly operatively connected with the valve piston. A direct operative connection of this type can be implemented in particular by a plunger that is kinematically coupled at the armature. An axial movement of the armature, in particular of the plunger is then transmitted to the valve piston so that the valve piston changes its position within the hydraulic assembly.

In addition to the coil other components can be integrally encased with the synthetic material through injection molding e.g. a magnetizable sleeve and/or a terminal cover and/or a tube that envelops the coil at least partially, and/or a magnetic tube and/or a pole core. In particular the armature can be supported within a sleeve of this type and/or within a magnetic tube of this type and/or within a pole core of this type.

In addition to the actuator housing configured as an integral encasement with synthetic material formed by injection molding one or plural external housings can be arranged at the actuator assembly wherein the external housings can provide increased protection for the actuator assembly.

Advantageously the connection is formed between the hydraulic assembly and a connection element of the actuator assembly, wherein the connection element is integrated into the plastic encasement, in particular so that the connection is formed in a form locking manner between the connection element and the valve housing or a bushing of the hydraulic assembly.

The connection between the connection element and the hydraulic assembly can alternatively be a friction locking and/or form locking and/or bonded connection.

In particular additional means for forming and/or reinforcing and/or sealing the connection can be arranged between the crimping ring and the hydraulic assembly, e.g. glue and/or synthetic material and/or a seal lip.

Advantageously the connection element is provided as a crimping ring, Advantageously the crimping ring can be configured so that known connection methods can be used.

Advantageously the connection of the hydraulic assembly with the crimping ring is formed by crimping. Thus, the two components, namely the crimping ring and the hydraulic assembly, in particular the valve housing or a bushing of the hydraulic assembly are connected with each other by plastic deformation, this can be performed for example by crimping and/or frizzling and/or folding of the joining partners. It is an advantage of the crimped connection that the joining partners can also be joined with a varying clearance so that a precise preparation of the joining partners can be omitted.

Alternatively or cumulatively the connection of the hydraulic assembly can be formed by ultrasonic welding. Thus, an element, that is configured to form an ultrasonic weld, in particular a plastic element can be used. An element of this type can be alternatively configured integrally with the hydraulic assembly or with the actuator housing. The ultrasonic connection facilitates an economical, in particular energy efficient and quick connection that can be produced in large numbers. In particular the ultrasonically welded connection can be configured and sized so that a sufficient torque is sustainable in the predetermined operating temperature range of the hydraulic valve.

Advantageously the connection element is integrally encased when the coil is encased with the synthetic material through the injection molding. This facilitates a simple and robust integration of the connection element into the plastic encasement and thus into the actuator housing.

Advantageously the connection element includes at least an axial section and at least one bar that engages the synthetic material encasement wherein the bar extends at an angle to the axial section. The axial section can thus extend in particular parallel to the longitudinal axis. The bar can be in particular integrally provided in one piece and/or from the same material as the connection element. A bar of this type improves an integration of the connection element into the plastic material encasement and thus improves the attachment of the connection element in the plastic material encasement. Thus, the bar can extend over a portion of the connection element circumference or over an entire connection element ring circumference. In particular the bar can extend at an angle of approximately 90° to the axial section. In particular also the axial section can engage the synthetic material encasement.

Advantageously the connection element includes at least one axial section and at least one bar that engages the plastic material encasement, wherein a transition to the bar is rounded and/or formed by a bevel a 45° bevel. A transition of this type reduces a formation of plastic flashing and thus improves an integration of the connection element in the synthetic material encasement.

Advantageously the connection element includes at least one axial section and plural bars that engage the plastic encasement wherein the bars extend at an angle to the axial section, in particular so that the bars are arrange with uniform angular distances over the circumference of the connection element. Bars of this type can be designated as cams or teeth which engage the plastic encasement and thus improve the attachment of the connection element in the plastic encasement. Thus, the connection element is fixed in particular against an axial movement and thus against a rotation relative to the synthetic material encasement. In particular also here at least one transition to at least one bar can be rounded and/or formed by a bevel, in particular a 45° bevel, in particular all transitions to the bars can be configured in this manner.

Advantageously the actuator assembly includes a tube which reaches around the coil at least partially directly or indirectly and which closes the ferrous loop. In particular the tube can be integrated into the plastic material encasement. In particular the tube can be integrally encased during the plastic material encasement. The tube can be a rolled and/or punched element, in particular made from a metal material. According to the invention the tube is not used to provide a connection with the hydraulic assembly.

In an advantageous embodiment the plastic material encasement is made from a thermoplastic synthetic material and envelopes the actuator assembly completely or partially. Advantageously the plastic material encasement is made from a polyamide or from a polyamide resin. In particular a 35% glass fiber reinforced heat stabilized hydrolysis resistant polyamide 66-resin for injection molding (PA 66 GF 35) can be used which has excellent flow capabilities.

Advantageously the connection element is made from a metal material. In particular the material can be corrosion resistant and/or provided with a corrosion protection. Thus for example a coating can be provided. Alternatively or cumulatively the connection element itself can be made from a corrosion resistant material, e.g. a non-corroding steel. In particular the connection element can be a rolled element and/or a stamped element.

Advantageously the valve housing and/or the bushing of the hydraulic assembly is made from a metal material, in particular aluminum. Typically this is the element of the hydraulic assembly which connects with the connection element. Advantageously the connection element covers plural undercuts and/or flat spots of the hydraulic assembly in particular of the valve housing or of the bushing of the hydraulic assembly in a form locking manner. Thus, tension forces as well as torques can be received. Sections of the connection element which reach over the undercuts at the hydraulic assembly in a form locking manner can be provided in particular integrally in one piece with the actuator housing. In case there are several undercuts and/or flat spots they can be configured as a symmetrical polygon. In case there are plural undercuts and/or flat spots of this type they can be arranged in an equidistant manner along the circumference of the hydraulic assembly. The under cuts and/or flat spots can form a symmetrical polygon, e.g. a hexagon. Four, five, six, eight, ten or twelve flat spots of a symmetrical polygon with 4, 5, 6, 8, 10 or 12 corners can be configured and arranged.

In particular the connection element can include at least one protrusion which reaches behind at least one under cut or flat spot of the hydraulic assembly and/or which contacts the undercut or the flat spot. The protrusion of the connection element which reaches over the undercut at the hydraulic assembly in a form locking manner can be configured in particular integrally in one piece with the connection element. In case there are plural protrusions they can be arranged with a uniform distance over the circumference of the connection element. In particular plural protrusions of the connection element can reach over an under cut or flat spot of the hydraulic assembly or can contact it.

Alternatively or cumulatively the hydraulic assembly can reach over one or plural under cuts or flat spots of the connection element. Thus the hydraulic assembly can have one or plural protrusions which reach behind one or plural corresponding under cuts and/or flat spots of the connection element or contact them. When there are several protrusions the protrusions of the hydraulic assembly can be arranged in an equidistant manner along the circumference of the hydraulic assembly. Furthermore the protrusions can be configured in particular integrally in one piece and from the same material as the hydraulic assembly. In particular the protrusions can be arranged at the valve housing or at a bushing of the hydraulic assembly.

It is particularly advantageous in a method for producing the electro hydraulic valve according to the invention with an actuator assembly and a hydraulic assembly wherein the hydraulic assembly includes at least one valve housing and wherein the actuator assembly includes an actuator housing and at least one coil, that the actuator housing of the actuator assembly is formed by synthetic material encasement at least of the coil, wherein the synthetic material encasement encases a connection element and wherein the connection between the connection element and the hydraulic assembly is formed, in particular that the connection is formed between the connection element and the valve housing or a bushing of the hydraulic assembly.

This can be in particular a form locking and/or a friction locking and/or a bonded connection between the connection element and the hydraulic assembly. In particular the actuator assembly and the hydraulic assembly can be arranged axially aligned along a longitudinal axis.

Thus, the connection element can be initially integrally encased by injection molding with the synthetic material and the connection between the crimping ring and the hydraulic assembly is formed thereafter. Alternatively the connection between the connection element and the hydraulic assembly can also be formed in the first step and thereafter the connection element is integrally encased with the synthetic material through injection molding.

In an advantageous embodiment the connection of the hydraulic assembly with the connection element is provided through crimping and/or ultrasonic welding.

In another advantageous embodiment a seal, in particular an O ring seal is inserted between the actuator assembly and the hydraulic assembly before establishing the connection of the hydraulic assembly with the connection element wherein the seal is axially compressed by joining and connecting the connection element and the hydraulic assembly.

BRIEF DESCRIPTION OF THE DRAWINGS

An embodiment of an electro hydraulic valve is described with reference to drawing figures, wherein.

DETAILED DESCRIPTION OF THE INVENTION

Identical components and subassemblies are designated in the drawing figures with identical reference numerals.

Figure 1:
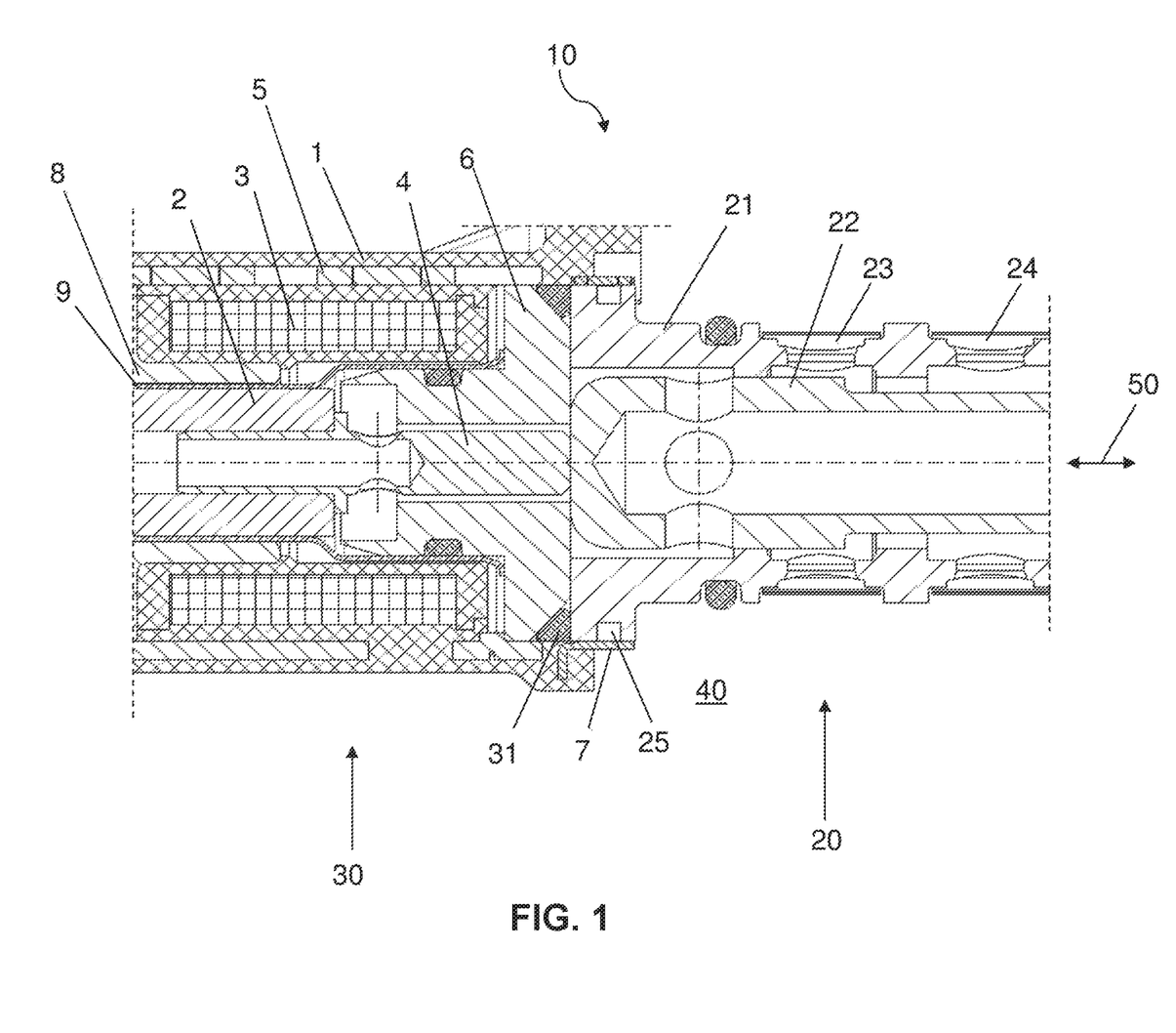
FIG. 1 illustrates a longitudinal sectional view of a hydraulic valve.

FIG. 1 illustrates a detail of a longitudinal sectional view of an electrohydraulic valve 10 according to the invention with the electromagnetic actuator assembly 30 and the hydraulic assembly 20. The illustrated electro hydraulic valve 10 is an electro hydraulic valve of a cam phaser. The dashed lines represent section lines. The electrohydraulic valve is not illustrated beyond the section lines.

A non-illustrated cam phaser facilitates during operations of a non-illustrated internal combustion engine to adjust opening and closing times of gas control valves of the internal combustion engine. Thus, an angular orientation of a non-illustrated cam shaft of the internal combustion engine is variably adjusted relative to a non-illustrated crank shaft of the internal combustion engine using the cam phaser wherein the cam shaft is rotated relative to the crank shaft. Rotating the cam shaft adjusts opening and closing times of the gas control valves so that the internal combustion engine is operated in an optimum manner at a respective speed.

The electro hydraulic valve 10 includes a hydraulic assembly 20 and an electromagnetic actuator assembly 30 which are arranged axially aligned along the longitudinal axis 50. The hydraulic assembly 20 includes a bushing shaped valve housing 21 in which a valve piston 22 is arranged axially movable along the longitudinal axis 50. The actuator assembly 30 includes an actuator housing 1. Furthermore a plunger 4 that is coupled to an armature 2 is arranged axially movable within the actuator assembly 30 to position the valve piston 22 along the longitudinal axis 50.

The actuator housing 1 of the actuator assembly 30 was formed by encasing the coil 3 and a tube 5 with a synthetic material through injection molding. Furthermore a pole core yoke 8, a pole core 6 and a sleeve 9 are inserted into the actuator housing 1. The armature 2 is supported within the sleeve 9.

Furthermore a connection element 7 that is configured as a crush ring is integrated into the actuator housing 1 wherein the connection element is integrally encased with the synthetic material during the injection molding. The valve housing 21 of the hydraulic assembly 20 is connected with the crush ring 7 by crimping. Thus, the actuator assembly 30 is indirectly connected with the hydraulic assembly 20 through the crush ring 7.

Loading the coil 3 of the actuator assembly 30 causes an axial displacement of the armature 2 and of the plunger 4 and thus an axial displacement of the valve piston 22. The valve housing 21 of the hydraulic assembly 20 and the valve piston 22 are flowed through by a hydraulic fluid. The hydraulic assembly 20 is sealed relative to the actuator assembly 30 by a seal element 31 that is configured as an O-ring and pressed into a circumferential ring groove 32 of the actuator assembly 30. As evident from FIGS. 1 and 2 the synthetic material encasement through injection molding defines the circumferential ring groove 32 in the radial direction and forms a circumferential seal surface 33 for the seal element. Thus, the circumferential annular groove 32 is configured as a triangular groove which is formed by an angled face 34 of the pole core 6, an axial face 35 of the valve housing 21 and the synthetic material encasement. The tube 5 which closes the ferrous loop is positioned so that a space between the tube 5 and the encased connection element (herein the crush ring 7) is created which is filled with the synthetic material. The synthetic material encasement advantageously forms the circumferential seal surface 33 where the seal element 31 contacts so that a leakage or a penetration of a medium into the actuator assembly 30 is reliably prevented. Thus, possible leaks of the tube 5 can also be sealed this way.

The hydraulic assembly 20 includes two operating connections 23 and 24 which can be supplied with hydraulic fluid by a non-illustrated channel system and by the flowable valve piston 22.

Figure 2:
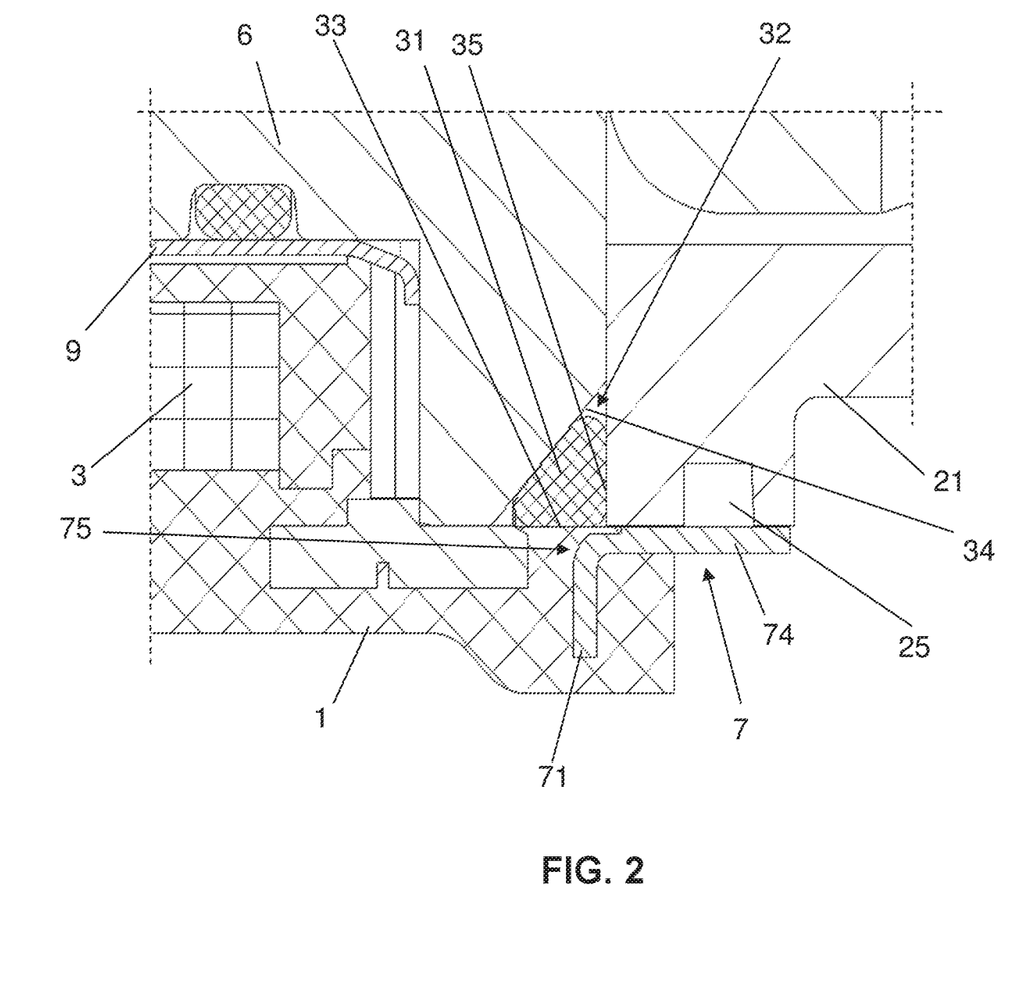
FIG. 2 illustrates an enlarged view of a connection according to FIG. 1.

FIG. 2 illustrates an enlarged view of the connection between the actuator assembly 30, the crush ring 7 and the hydraulic assembly 20. Thus, the crush ring 7 has an axial section 74 that extends parallel to the longitudinal axis 50 and one of plural bars 71. The bar 71 extends at an angle of approximately 90° to the axial section 94. A fillet 75 is formed between the bar 71 and the axial section of the crush ring 7 wherein the fillet facilitates an improved synthetic material encasement of the crush ring 7 in that the fillet 75 reduces a plastic flashing formation during the encasement with the synthetic material through the injection molding.

The crush ring 7 engages an undercut 25 of the valve housing 21 by a non-illustrated protrusion. This way the connection between the crush ring 7 and the valve housing 21 is formed. A protrusion 72 of this type of the crush ring 7 is illustrated in FIG. 4 and is created when crimping the crush ring 7 together with the valve housing 21.

Figure 3:
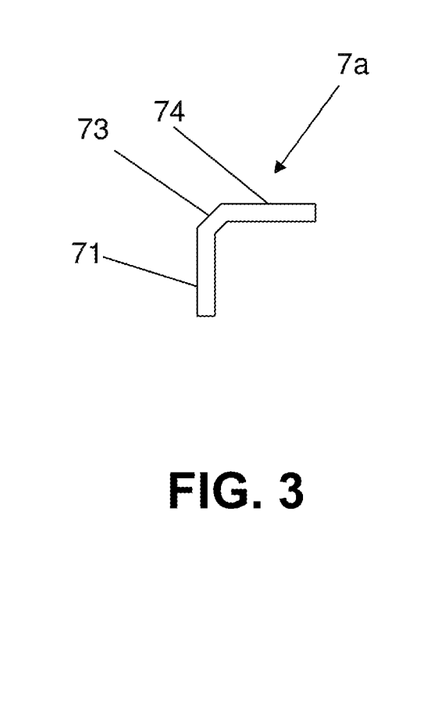
FIG. 3 illustrates a side view of a crimping ring.

FIG. 3 illustrates a side view of a crush ring 7 wherein a transition 73 between the axial section 74 and the bar 71 is formed by a 45° bevel. A bevel of this type reduces synthetic material flashing when encasing with the synthetic material through injection molding.

Figure 4:
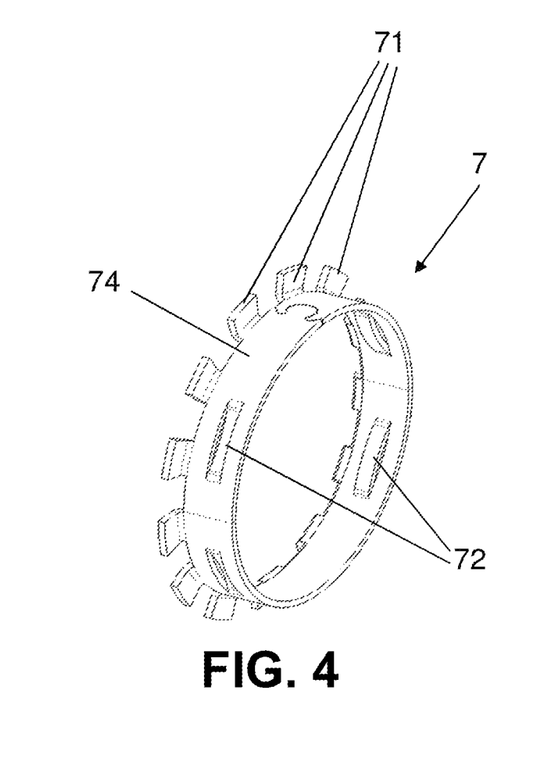
FIG. 4 illustrates a perspective view of a crimping ring.

FIG. 4 illustrates a perspective view of the crush ring 7 with a plurality of bars 71 and with plural protrusions 72. The crush ring 7 is a punched and rolled component made from stainless steel. The bars 71 and the protrusion 72 are arranged with uniform spacing over the circumference of the crush ring 7 and integrally configured in one piece together with the crush ring 7. Through the bars 71 the crush ring 7 can be integrated in an optimum manner into the synthetic material encasement and fixed. The bars 71 extend at an angle of approximately 90° to the axial section 74 of the crush ring 7.

Figure 5:
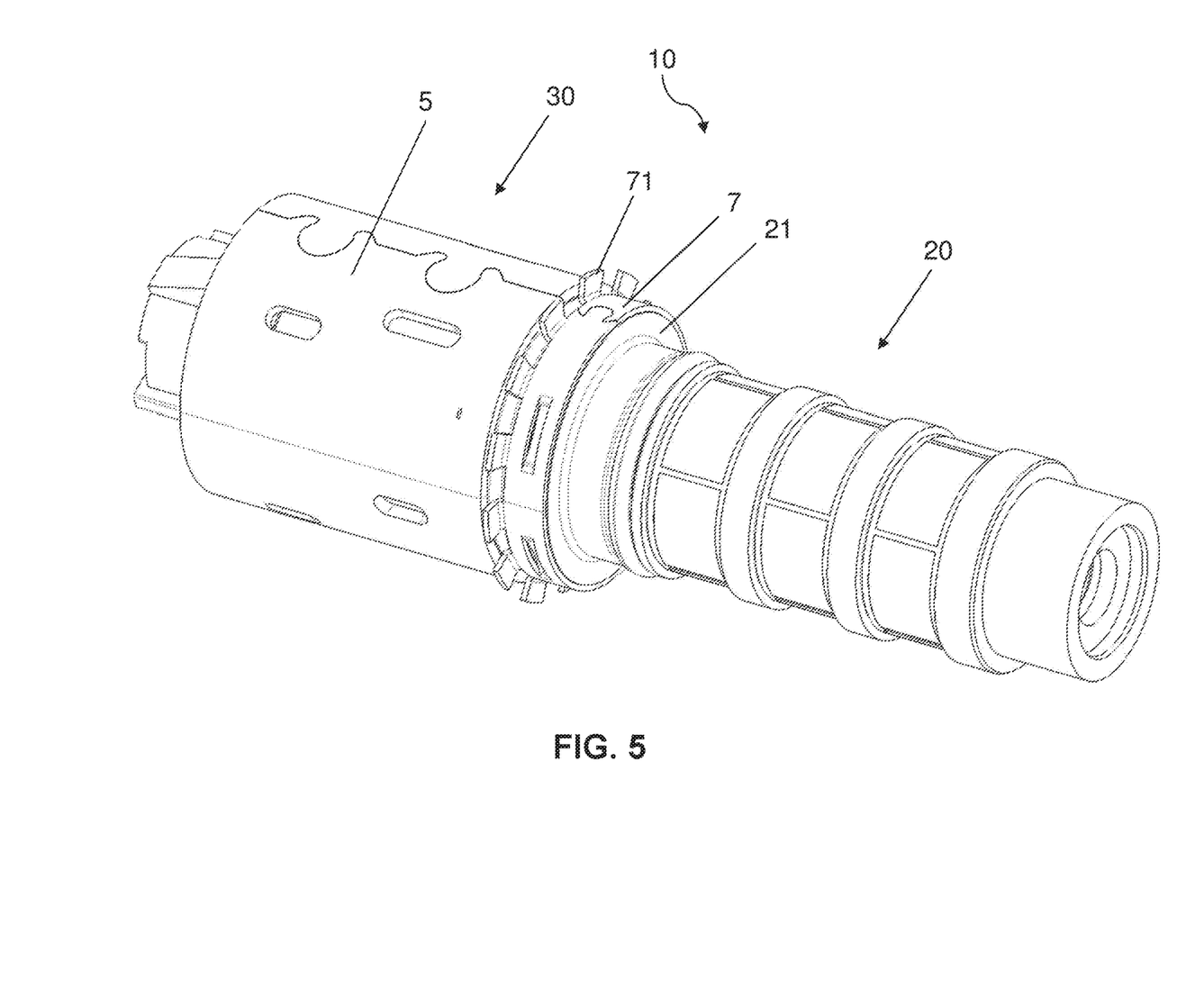
FIG. 5 illustrates a perspective view of a hydraulic valve without synthetic material encasement through injection molding.

FIG. 5 illustrates a perspective view of an electro hydraulic valve 10 without the synthetic material encasement. Thus the crush ring 7 is already crimped together with the valve housing 21 of the hydraulic assembly 20. Thus the tube 5 does not reach around the non-visible coil 3 according to FIG. 1 wherein the tube 5 is not used for connecting with the hydraulic assembly 20.

Alternatively other connection elements are feasible to connect the hydraulic assembly with the actuator assembly within the scope and spirit of the invention. For example the connection element can be configured as an element suitable for ultrasonic welding. An element of this type, advantageously a synthetic material element, can be configured as a separate component or alternatively integrally with the hydraulic assembly or the actuator housing. The ultrasonic weld facilitates an economical energy efficient quick connection that is producible in large numbers. In particular the ultrasonic weld can be configured and sized to withstand a sufficient torque within the predetermined operating temperature range of the electro hydraulic valve.

What is claimed is:
1. An electrohydraulic valve, comprising:
an electromagnetic actuator assembly; and
a hydraulic assembly,
wherein the electromagnetic actuator assembly and the hydraulic assembly are arranged in axial alignment along a longitudinal axis,
wherein the hydraulic assembly includes a valve housing in which a valve piston is arranged axially movable along the longitudinal axis,
wherein the electromagnetic actuator assembly includes an actuator housing, a coil configured to generate a magnetic field and an armature that is arranged axially movable along the longitudinal axis to position the valve piston,
wherein a connection is formed between the electromagnetic actuator assembly and the hydraulic assembly,
wherein the actuator housing is formed by an encasement of at least the coil with a synthetic material through injection molding,
wherein a circumferential annular groove is formed in which a seal element is positioned that seals the electromagnetic actuator assembly between the hydraulic assembly and the electromagnetic actuator assembly, and
wherein the encasement with the synthetic material through the injection molding defines the circumferential annular groove in the radial direction and forms a circumferential sealing surface for the seal element,
wherein the connection is formed between the hydraulic assembly and a connection element of the electromagnetic actuator assembly, and wherein the connection element is integrated in the synthetic material encasement,
wherein the connection is formed through form locking between the connection element and the valve housing or a bushing of the hydraulic assembly,
wherein the connection element includes at least an axial section and at least one bar that engages the synthetic material encasement, and
wherein the bar is oriented at an angle relative to the axial section.

2. The electro hydraulic valve according to claim 1, wherein the connection element is configured as a crush ring.

3. The electro hydraulic valve according to claim 2, wherein the connection of the hydraulic assembly with the crush ring is formed by a crimp.

4. The electro hydraulic valve according to claim 1, wherein the connection element is integrally encased together with the coil by the synthetic material through the injection molding.

5. The electro hydraulic valve according to claim 1,
wherein the connection element includes at least an axial section and at least one bar that engages the synthetic material encasement, and
wherein a transition to the at least one bar is rounded or formed by a bevel.

6. The electro hydraulic valve according to claim 1,
wherein the connection element includes at least one axial section and plural bars that engage the synthetic material encasement,
wherein the plural bars are oriented at an angle to the axial section, and
wherein the plural bars are arranged with uniform angle spacing over a circumference of the connection element.

7. The electro hydraulic valve according to claim 1,
wherein the electromagnetic actuator assembly includes a tube which engages the coil at least partially indirectly or directly, and
wherein the tube is integrated into the synthetic material encasement.

8. The electro hydraulic valve according to claim 1, wherein the synthetic material encasement is made from a thermoplastic material and envelops the actuator assembly completely or partially.

9. The electro hydraulic valve according to claim 1,
wherein the connection element is made from a metal material, and
wherein the metal material is corrosion resistant or provided with corrosion protection.

10. The electro hydraulic valve according to claim 1, wherein the valve housing or the bushing of the hydraulic assembly is made from a metal material.

11. The electro hydraulic valve according to claim 1, wherein the connection element reaches over at least one undercut or flat spot of the hydraulic assembly in a form locking manner.

12. A method for producing the electro hydraulic valve according to claim 1, the electro hydraulic valve including
an electromagnetic actuator assembly, and
a hydraulic assembly,
wherein the hydraulic assembly includes at least a valve housing, and
wherein the actuator assembly includes an actuator housing and at least a coil,
the method comprising the steps:
forming the actuator housing of the actuator assembly by encasing at least the coil with a synthetic material through injection molding;
encasing a connection element through the injection molding;
forming a connection between the connection element and the hydraulic assembly in a form locking manner between the connection element and the valve housing or a bushing of the hydraulic assembly.

13. A method for producing an electro hydraulic valve including
an electromagnetic actuator assembly, and
a hydraulic assembly,
wherein the electromagnetic actuator assembly and the hydraulic assembly are arranged in axial alignment along a longitudinal axis,
wherein the hydraulic assembly includes a valve housing in which a valve piston is arranged axially movable along the longitudinal axis,
wherein the electromagnetic actuator assembly includes an actuator housing, a coil configured to generate a magnetic field and an armature that is arranged axially movable along the longitudinal axis to position the valve piston,
wherein a connection is formed between the electromagnetic actuator assembly and the hydraulic assembly,
wherein the actuator housing is formed by an encasement of at least the coil with a synthetic material through injection molding,
wherein a circumferential annular groove is formed in which a seal element is positioned that seals the electromagnetic actuator assembly between the hydraulic assembly and the electromagnetic actuator assembly, and
wherein the encasement with the synthetic material through the injection molding defines the circumferential annular groove in the radial direction and forms a circumferential sealing surface for the seal element, the method comprising:
forming the actuator housing of the actuator assembly by encasing at least the coil with a synthetic material through injection molding;
encasing a connection element through the injection molding;
forming a connection between the connection element and the hydraulic assembly in a form locking manner between the connection element and the valve housing or a bushing of the hydraulic assembly,
wherein the connection of the hydraulic assembly with the connection element is provided by crimping or ultrasonic welding.

* * * * *